(12) United States Patent
Kawasaki

(10) Patent No.: US 11,400,942 B2
(45) Date of Patent: Aug. 2, 2022

(54) VEHICLE LANE TRAJECTORY PROBABILITY PREDICTION UTILIZING KALMAN FILTERING WITH NEURAL NETWORK DERIVED NOISE

(71) Applicant: KABUSHIKI KAISHA TOSHIBA, Tokyo (JP)

(72) Inventor: Atsushi Kawasaki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 68 days.

(21) Appl. No.: 16/801,778

(22) Filed: Feb. 26, 2020

(65) Prior Publication Data

US 2021/0001860 A1    Jan. 7, 2021

(30) Foreign Application Priority Data

Jul. 5, 2019    (JP) .............................. JP2019-125939

(51) Int. Cl.
*B60W 40/04*    (2006.01)
*G08G 1/16*    (2006.01)
*B60W 50/00*    (2006.01)

(52) U.S. Cl.
CPC ........ *B60W 40/04* (2013.01); *B60W 50/0097* (2013.01); *G08G 1/167* (2013.01); *B60W 2552/10* (2020.02); *B60W 2554/404* (2020.02)

(58) Field of Classification Search
CPC ............ B60W 40/04; B60W 50/0097; B60W 2554/404; B60W 2552/10; G08G 1/167
See application file for complete search history.

(56) References Cited

U.S. PATENT DOCUMENTS 9,248,834 B1 *   2/2016   Ferguson ............. G05D 1/0088
9,612,123 B1 *   4/2017   Levinson ............. B60W 30/09
(Continued)

FOREIGN PATENT DOCUMENTS

JP    6272566 B2    1/2017
JP    6272566 B2    1/2018

OTHER PUBLICATIONS

"Kalman Filter"; Jun. 2019, Wikipedia, retrieved via waybackmachine (Year: 2019).*

(Continued)

*Primary Examiner* — Peter D Nolan
*Assistant Examiner* — Kenneth M Dunne
(74) *Attorney, Agent, or Firm* — Knobbe, Martens, Olson & Bear, LLP

(57) ABSTRACT

A prediction device includes a lane information obtaining unit, an estimating unit, and a predicting unit. The observation-value-obtaining unit obtains an observation value of mobile object' movement. The lane information obtaining unit obtains lane information regarding lanes within a threshold distance of the mobile object. Based on the observation value and the lane information, the estimating unit estimates temporal change volume and likelihood information. The predicting unit identifies target lanes based on the likelihood information, and for the identified target lanes, based on current-state information indicating one or more states of the mobile object indicated by the observation value obtained at the reference time and based on the temporal change volume, calculates predicted-state information indicating one or more states of the mobile object after the reference time when the mobile object moves to the target lane.

17 Claims, 10 Drawing Sheets

(56) References Cited

U.S. PATENT DOCUMENTS

| | | | | |
|---|---|---|---|---|
| 2008/0154629 | A1* | 6/2008 | Breed | B60N 2/2863 |
| | | | | 705/1.1 |
| 2014/0088855 | A1* | 3/2014 | Ferguson | G08G 1/166 |
| | | | | 701/117 |
| 2014/0303882 | A1* | 10/2014 | Jang | G08G 1/166 |
| | | | | 701/119 |
| 2015/0178573 | A1* | 6/2015 | Viswanath | G06V 20/588 |
| | | | | 382/103 |
| 2016/0210525 | A1* | 7/2016 | Yang | G06V 30/2504 |
| 2016/0318513 | A1* | 11/2016 | Lee | B60W 50/14 |
| 2016/0350603 | A1* | 12/2016 | Suddamalla | G06V 10/60 |
| 2018/0144369 | A1* | 5/2018 | Pouliot | B60W 30/095 |
| 2018/0182245 | A1 | 6/2018 | Takabayashi et al. | |
| 2019/0113929 | A1* | 4/2019 | Mukadam | G08G 1/167 |
| 2020/0089246 | A1* | 3/2020 | McGill, Jr. | G06N 5/046 |
| 2020/0342756 | A1* | 10/2020 | MacKenzie | G01S 13/862 |
| 2021/0056713 | A1* | 2/2021 | Rangesh | G06K 9/6267 |
| 2021/0110484 | A1* | 4/2021 | Shalev-Shwartz | B60W 10/20 |

OTHER PUBLICATIONS

Park et al, "Measurement Noise Recommendation for Efficient Kalman Filtering over a Large Amount of Sensor Data", Mar. 2019, MDPI (Multi-Disciplinary Publishing Institute). (Year: 2019).*

Park et al, "Measurement Noise Recommendation for Efficient Kalman Filtering overa Large amount of Sensor Data", Mar. 2019, MDPI (Multi-Disciplinary Publishing Institute). 2019 (Year: 2019).*

Cui et al., "Multimodal Trajectory Predictions for Autonomous Driving using Deep Convolutional Networks", 2019 International Conference on Robotics and Automation (ICRA) Palais des congres de Montreal, Montreal, Canada, May 20-24, 2019, pp. 2090-2096.

Deo et al., "Multi-Modal Trajectory Prediction of Surrounding Vehicles with Maneuver based LSTMs" IEEE Intelligent Vehicle Symposium (IV), 2018.

Houenou et al., "Vehicle Trajectory Prediction based on Motion Model and Maneuver Recognition", 2013 IEEE/RSJ International Conference on Intelligent Robots and Systems (IROS), Nov. 3-7, 2013. Tokyo, Japan, pp. 4363-4369.

* cited by examiner

VEHICLE LANE TRAJECTORY PROBABILITY PREDICTION UTILIZING KALMAN FILTERING WITH NEURAL NETWORK DERIVED NOISE

CROSS-REFERENCE TO RELATED APPLICATIONS

This application is based upon and claims the benefit of priority from Japanese Patent Application No. 2019-125939, filed on Jul. 5, 2019; the entire contents of which are incorporated herein by reference.

FIELD

Embodiments described herein relate generally to a prediction device, a prediction method, a computer program product, and a vehicle control system.

BACKGROUND

An autonomous driving system or a driving assistance system needs to guarantee safety without disturbing the traffic. For that reason, the driving system needs to recognize the states of the other mobile objects that are present in the vicinity. Moreover, the driving system needs to predict the future states of the other vehicles in the near future of several seconds.

For example, at a traffic intersection which consists of bifurcated and intersected lanes, it is difficult for a driving system to uniquely predict, from among a plurality of lanes, which lane another mobile object moves on. Hence, at a traffic intersection which consists of bifurcated and intersected lanes, the driving system needs to predict the future state of another mobile object regarding each of a plurality of lanes.

However, such prediction processing requires an extremely large amount of computing. Moreover, in such prediction processing, the computing with respect to the lanes on which the other mobile object did not actually go is a waste of time.

DETAILED DESCRIPTION

A prediction device includes one or more hardware processors configured to function as an observation value obtaining unit, a lane information obtaining unit, an estimating unit, and a predicting unit. The observation value obtaining unit obtains an observation value related to a movement of a mobile object. The lane information obtaining unit obtains lane information regarding a plurality of lanes having a possibility that the mobile object moves after a reference time (i.e., lanes within a threshold distance of the mobile object). Based on the observation value and the lane information, the estimating unit estimates temporal change volume indicating a feature of state of the mobile object with respect to the plurality of lanes, and likelihood information indicating a likelihood that the mobile object moves each of the plurality of lanes. The predicting unit identifies one or more target lanes from among the plurality of lanes based on the likelihood information, and, for each of the one or more target lanes that are identified, based on current-state information indicating one or more states of the mobile object as indicated by the observation value obtained at the reference time and based on the temporal change volume, calculates predicted-state information indicating one or more states of the mobile after the reference time in case in which the mobile object moves to the target lane.

An exemplary embodiment is described below with reference to the drawings. The embodiment is implemented for predicting the future states of mobile objects.

In the embodiment, a mobile object implies an automobile or a motorbike that moves to lanes on the road. However, a mobile object is not limited to an automobile or a motorbike. Alternatively, for example, a mobile object can be a robot that moves to lanes on the road. Still alternatively, a mobile object can be an object that moves to lanes on the water.

Figure 1:
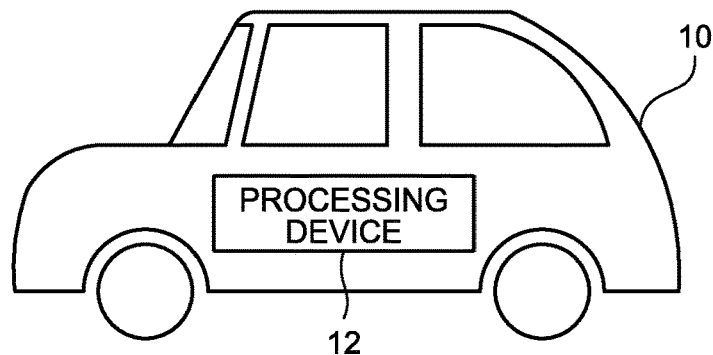
FIG. 1 is a diagram illustrating a vehicle according to an embodiment.

FIG. 1 is a diagram illustrating a vehicle 10 according to the embodiment. The vehicle 10 has a processing device 12 installed therein. The processing device 12 is a device including, for example, a dedicated computer or a general-purpose computer. The processing device 12 need not have the information processing function installed in the vehicle 10 and can have it installed in some other device such as cloud that is connected to the vehicle 10 via a network. For example, the vehicle 10 can be a normal vehicle that runs as a result of the driving done by a person or can be a self-driving vehicle capable of automatic running (autonomous running) without receiving driving operations from a person. Meanwhile, the processing device 12 need not be installed in the vehicle 10 and can be installed in some other device such as a roadside device.

Figure 2:
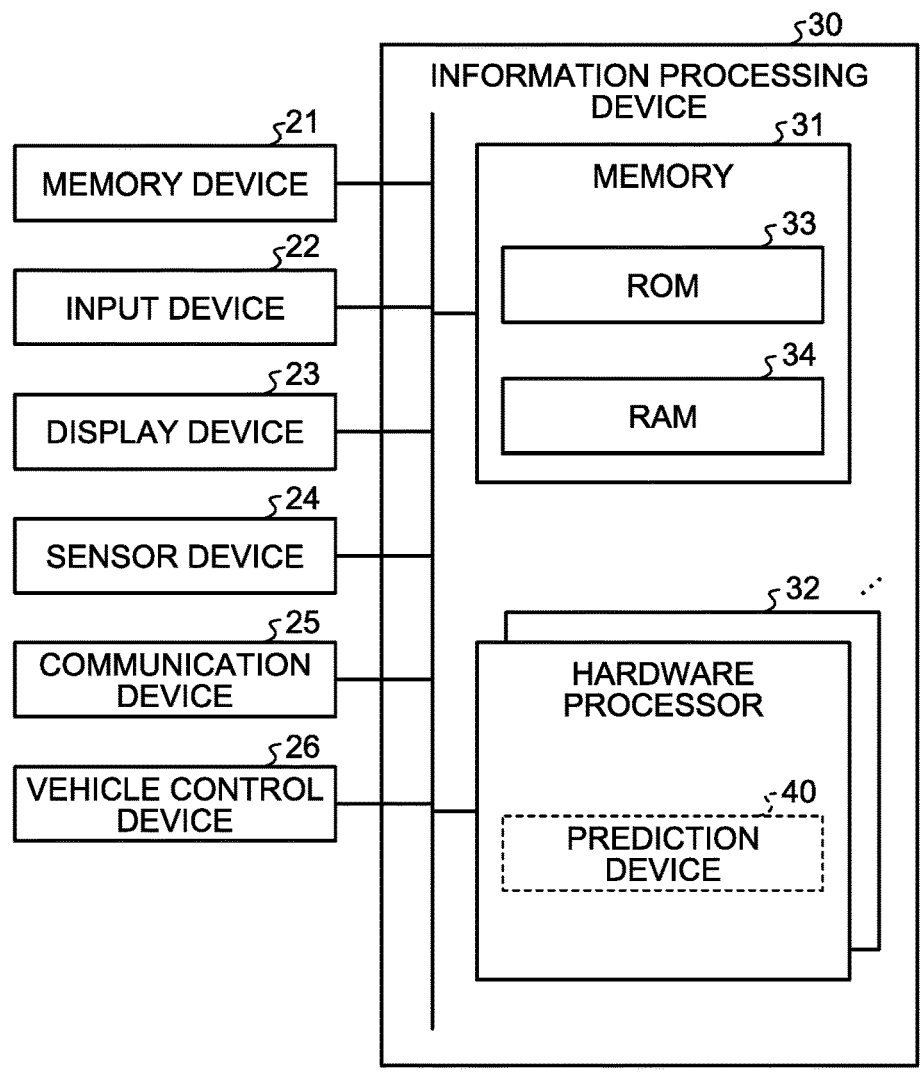
FIG. 2 is a configuration diagram of a processing device.

FIG. 2 is a diagram illustrating an exemplary configuration of the processing device 12 according to the embodiment. The processing device 12 includes a memory device 21, an input device 22, a display device 23, a sensor device 24, a communication device 25, a vehicle control device 26, and an information processing device 30.

The memory device 21 is a semiconductor memory device such as a hard disk drive, an optical drive, or a flash drive. The memory device 21 is used to store the computer programs to be executed by the processing device 12 and to store the data to be used by the processing device 12.

The input device 22 receives input of instructions and information from the user. For example, the input device 22 is an operation panel; or a pointing device such as a mouse or a trackball; or an input device such as a keyboard.

The display device 23 displays a variety of information to the user. For example, the display device 23 is a display device such as a liquid crystal display device.

The sensor device 24 includes one or more sensors for detecting the surrounding situation of the vehicle 10. For example, the sensor device 24 detects the position, the velocity, the acceleration, the angular velocity, and the angular acceleration of each other mobile object (for example, each other vehicle) present around the vehicle 10. Moreover, the sensor device 24 detects direction instruction information indicating the travel direction of each mobile object present around the vehicle 10. For example, the sensor device 24 includes a distance sensor (LiDAR). Alternatively, the sensor device 24 can include a sonar device that detects the distances to the surrounding objects using acoustic waves. Still alternatively, the sensor device 24 can include a camera that takes images of the surrounding objects.

The communication device 25 sends information to and receives information from external devices via wireless communication. The communication device 25 obtains the detection result obtained by the sensors, which are installed in the external devices of the vehicle 10 (such as roadside devices), regarding the position, the velocity, the acceleration, the angular velocity, the angular acceleration, and the direction instruction information of the mobile objects present around the vehicle 10. Alternatively, the communication device 25 can perform direct communication, such as inter-vehicle communication, with a mobile object present around the vehicle 10; and can obtain the position, the velocity, the acceleration, the angular velocity, the angular acceleration, and the direction instruction information of that mobile object.

Moreover, the communication device 25 receives map information of the surrounding of the vehicle 10 from a server. The map information contains, for example, lane information regarding the route of each of one or more lanes that a mobile object may take in the near future of several seconds. Moreover, information indicating the curvature of each of one or more lanes; stop line information indicating the positions of the stop lines at which the mobile objects (for example, the vehicle 10 and other vehicles) stop; boundary line information indicating the boundary lines (white lanes) among the lanes; and crosswalk information indicating the positions of pedestrian crosswalks can be received as the map information from a server. Furthermore, the communication device 25 receives, from the roadside devices installed around the vehicle 10, signal light information indicating the lighting state of the signal lights installed in each of one or more lanes on which the mobile objects go on.

The vehicle control device 26 controls the drive mechanism for driving the vehicle 10. For example, when the vehicle 10 is a self-driving vehicle, the vehicle control device determines the surrounding situation based on the information obtained from the sensor device 24 and the other information; and controls the acceleration amount, the braking amount, and the steering angle. On the other hand, when the vehicle 10 is a normal vehicle that runs as a result of driving performed by a person, the vehicle control device 26 controls the acceleration amount, the braking amount, and the steering angle according to the operation information.

The information processing device 30 represents, for example, one or more dedicated computers or one or more general-purpose computers. The information processing device 30 manages and controls the memory device 21, the input device 22, the display device 23, the sensor device 24, the communication device 25, and the vehicle control device 26. The information processing device 30 includes a memory 31 and one or more hardware processors 32.

The memory 31 includes, for example, a read only memory (ROM) 33 and a random access memory (RAM) 34. The ROM 33 is used to store computer programs that are used in the control performed by the information processing device 30 and to store, in a non-rewritable manner, a variety of setting information. The RAM 34 is a volatile memory medium such as a synchronous dynamic random access memory (SDRAM). The RAM 34 functions as the work area for the one or more hardware processors 32.

The one or more hardware processors 32 are connected to the memory 31 (the ROM 33 or the RAM 34) via a bus. For example, the one or more hardware processors 32 can include one or more central processing units (CPUs) or include one or more graphics processing units (GPUs). Moreover, the one or more hardware processors 32 can include a semiconductor device having a dedicated processing circuit for implementing a neural network.

The one or more hardware processors 32 function as a prediction device 40 as the result of performing various operations in collaboration with the various computer programs, which are stored in advance in the ROM 33 or the memory device 21, while using a predetermined area of the ROM 34 as the work area. Regarding the prediction device 40, the detailed explanation is given below.

Figure 3:
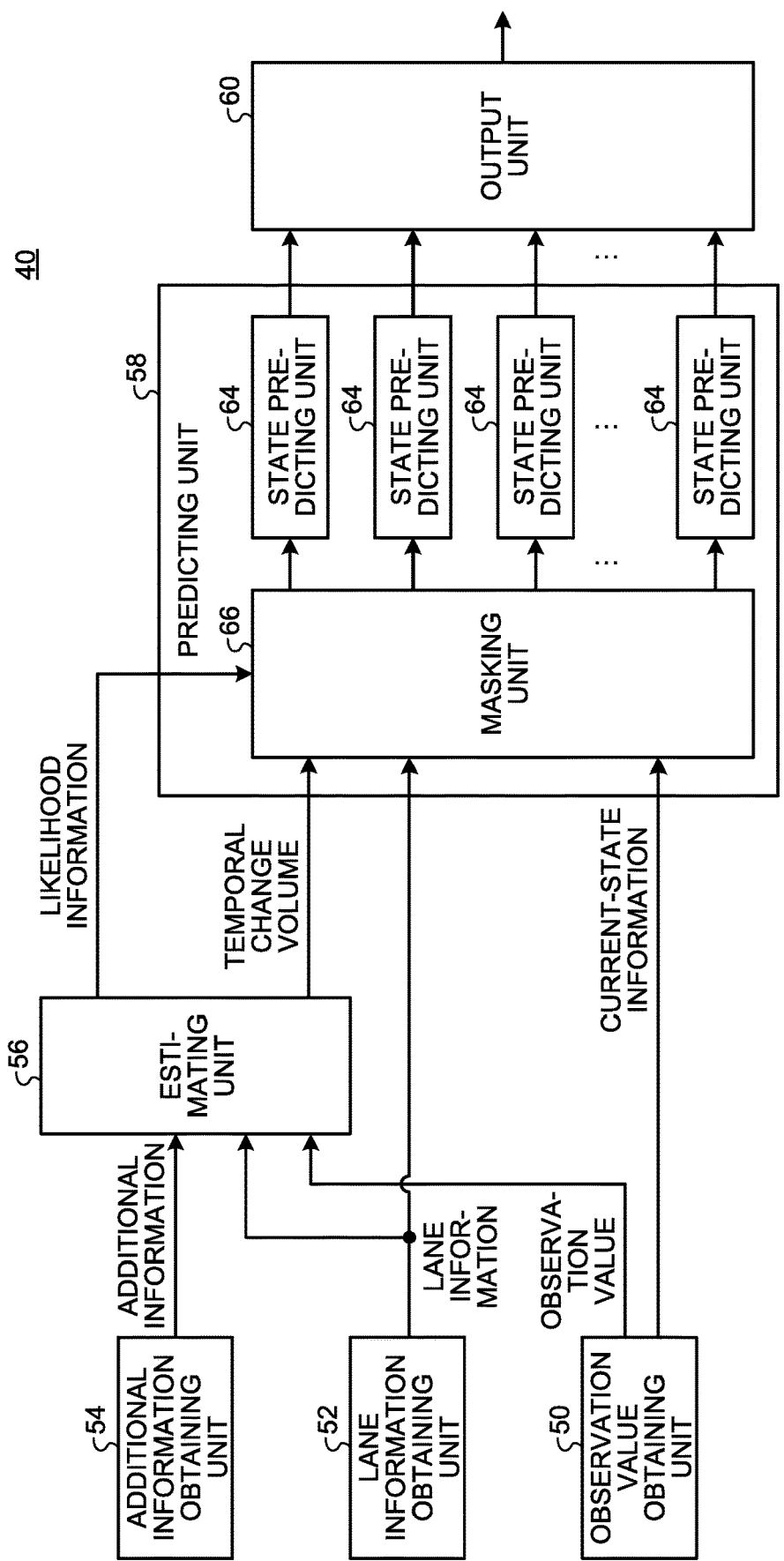
FIG. 3 is a configuration diagram of a prediction device.

FIG. 3 is a diagram illustrating a configuration of the prediction device 40. The prediction device 40 predicts one or more future states in the near future of a mobile object (for example, another vehicle) present around the vehicle 10. The future states of a mobile object imply, for example, the position, the velocity, the acceleration, the angular velocity, and the angular acceleration of the mobile object at predetermined time steps within the period of time from the current time to the time arriving after several seconds.

The information processing device 30 displays one or more future states, which are predicted by the prediction device 40, in the display device 23. Moreover, based on one or more predicted future states of the mobile object, the information processing device 30 determines the risk of collision between the mobile object and the vehicle 10, and then issues a warning to the driver based on the determination result. Moreover, the information processing device 30 can send, to the vehicle control device 26, one or more future states of the mobile object as predicted by the prediction device 40. Based on the one or more predicted future states of the mobile object, the vehicle control device 26 controls the vehicle 10 with the aim of avoiding collision with the mobile object and with the aim of not disturbing the surrounding flow of traffic.

The prediction device 40 includes an observation value obtaining unit 50, a lane information obtaining unit 52, an additional information obtaining unit 54, an estimating unit 56, a predicting unit 58, and an output unit 60.

The observation value obtaining unit 50 obtains, at predetermined time intervals (of few tens of milliseconds or few hundreds of milliseconds, for example), one or more observation values related to the movement of a mobile object. Herein, the mobile object implies another vehicle present around the vehicle 10.

In the embodiment, the observation value obtaining unit 50 obtains the position, the velocity, the acceleration, the angular velocity, and the angular acceleration of the mobile object as one or more observation values from the sensor device 24 and the communication device 25. Moreover, the observation value obtaining unit 50 can obtain, as the observation values, the variance of the position of the mobile object, the variance of the velocity of the mobile object, the variance of the acceleration of the mobile object, and the variance of the angular acceleration of the mobile object.

In the embodiment, the observation value obtaining unit 50 sends, to the estimating unit 56, temporal data of observation values that indicates one or more observation values at predetermined time intervals starting from a time prior to the reference time to the reference time. Moreover, the observation value obtaining unit 50 sends, to the predicting unit 58, current-state information representing one of more states of the mobile object as indicated by one or more observation values obtained at the reference time. In the embodiment, the reference time implies the current time. For example, the current-state information represents at least one of the following states of the mobile object at the reference time: the position; the velocity; the acceleration; the angular velocity; the angular acceleration; the variance of the position; the variance of the velocity; the variance of the acceleration; and the variance of the angular acceleration.

After the reference time has passed, the lane information obtaining unit 52 obtains lane information regarding one or more lanes having a possibility that the mobile object moves. The lane information obtaining unit 52 obtains the lane information from a server via the communication device 25 and from the memory device 21. Then, the lane information obtaining unit 52 sends the obtained lane information to the estimating unit 56 and the predicting unit 58.

A lane represents a recommended route for the mobile object. The lane information contains one or more sets of individual lane information. A set of individual lane information indicates the recommended route regarding a single lane. For example, the individual lane information is expressed as a set of coordinates (a point sequence) indicating the center position of the concerned lane. For example, the individual lane information can be expressed using a function or a parameter (for example, a straight line, an arc, a spline curve, or a clothoid curve) representing the straight line or the curve joining the center of the concerned lane.

The additional information obtaining unit 54 obtains additional information representing the surrounding road environment of one or more lanes having a possibility that the mobile object moves. The additional information obtaining unit 54 obtains the additional information from the communication device 25 or the memory device 21. Regarding each of one or more lanes, the additional information includes at least one of the following information: signal light information, curvature information, stop line information, boundary line information, and crosswalk information. For example, when the signal light information is included in the additional information, the additional information obtaining unit 54 obtains the additional information at predetermined time intervals. In the embodiment, the additional information obtaining unit 54 sends temporal data of additional information, which indicates the additional information at predetermined time intervals, to the estimating unit 56.

The estimating unit 56 estimates the temporal change volume based on the following: the temporal data of observation values from a time prior to the reference time to the reference time; the lane information; and the temporal data of additional information from a time prior to the reference time to the reference time. The temporal change volume represents, from a time prior to the reference time to the reference time, the features of the state of the mobile object with respect to each of one or more lanes.

Firstly, based on the temporal data of observation values and the lane information, the estimating unit 56 calculates, for each of one or more lanes, temporal data of error information (or temporal error information) indicating the error between the mobile object and the concerned lane from a time prior to the reference time to the reference time.

Moreover, the estimating unit 56 estimates the temporal change volume based on the temporal data of observation values, the temporal data of error information, and the temporal data of additional information. For example, the estimating unit 56 estimates the temporal change volume by inputting the temporal data of observation values, the temporal data of error information, and the temporal data of additional information in a recurrent neural network.

Furthermore, based on the temporal change volume; the estimating unit 56 estimates, for each of one or more lanes, likelihood information that indicates the likelihood that the mobile object moves to the concerned lane. For example, the estimating unit 56 estimates the likelihood information by inputting the temporal change volume in a neural network.

Then, the estimating unit 56 sends the likelihood information to the predicting unit 58. Moreover, the estimating unit 56 sends the temporal change volume to the predicting unit 58. The further explanation about the estimating unit 56 is given later with reference to FIG. 6.

Based on the likelihood information, the predicting unit 58 identifies one or more target lanes from among a plurality of lanes. For example, the predicting unit 58 identifies, as one or more target lanes from among a plurality of lanes, one or more lanes having the likelihood to be equal to or greater than a predetermined value. Alternatively, for example, the predicting unit 58 identifies, from among a plurality of lanes, one or more lanes corresponding to a predetermined number of likelihoods from the top as one or more target lanes.

Then, for each of the one or more identified target lanes, based on the temporal change volume, the current-state information, and the lane information; the predicting unit 58 calculates predicted-state information indicating one or more states of the mobile object attained after the reference time when the mobile object moves to the concerned target lane.

For example, the predicting unit 58 calculates the predicted-state information corresponding to each of a plurality of times at predetermined time steps taken after the current time. For example, at each of a plurality of times at predetermined time steps taken after the reference time, the predicted-state information represents at least one of the following states of the mobile object: the position; the velocity; the acceleration; the angular velocity; the angular acceleration; the variance of the position; the variance of the velocity; the variance of the acceleration; and the variance of the angular acceleration.

The predicting unit 58 includes a plurality of state predicting units 64 and a masking unit 66.

Each state predicting unit 64 is installed corresponding to one of a plurality of lanes. Each state predicting unit 64 obtains, via the masking unit 66, the temporal change volume regarding the corresponding lane, the current-state information regarding the corresponding lane, and the individual lane information regarding the corresponding lane as included in the lane information. Then, based on the obtained information, each state predicting unit 64 calculates the predicted-state information indicating one or more states of the mobile object attained after the reference time when the mobile object moves to the corresponding lane.

In the embodiment, each state predicting unit 64 calculates the predicted-state information using a Kalman filter. Regarding a configuration of the state predicting unit 64 that uses a Kalman filter, further detailed explanation is given later with reference to FIG. 8.

The masking unit 66 identifies, based on the likelihood information, one or more target lanes from among a plurality of lanes. Then, from among a plurality of state predicting unit 64, to one or more state predicting units 64 corresponding to the one or more identified target lanes, the masking unit 66 sends the temporal change volume, the current-state information, and the individual lane information of the corresponding lanes. As a result, from among a plurality of state predicting unit 64, the masking unit 66 can make one or more state predicting units 64, which correspond to the one or more identified target lanes, calculate the predicted-state information.

The output unit 60 outputs the predicted-state information that is calculated by the predicting unit 58 regarding the one or more target lanes. For example, the output unit 60 displays the predicted-state information in the display device 23, or sends the predicted-state information to the vehicle control device 26.

Figure 4:
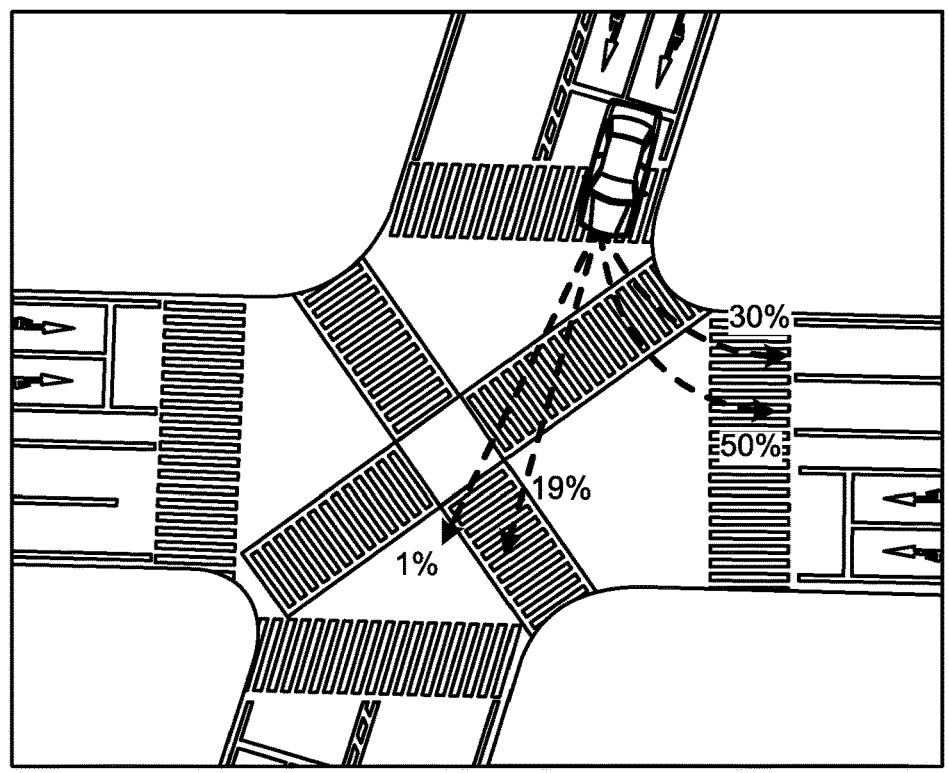
FIG. 4 is diagram illustrating the likelihood with respect to each of a plurality of lanes.

FIG. 4 is diagram illustrating a plurality of lanes having a possibility that a mobile object moves and illustrating the likelihood with respect to each lane.

At the reference time (the current time), an automobile 70 (a mobile object) starts entering a traffic intersection from the lane for through traffic and left turn. In the example illustrated in FIG. 4, in the near future after several seconds, there are four lanes having a possibility that the automobile 70 moves.

In such a case, the estimating unit 56 estimates the likelihood information that indicates the likelihood of the automobile 70 going on each of the four lanes. For example, with reference to FIG. 4, the likelihood information indicates that there is a 1% possibility that the automobile 70 travels straight and moves to the right-side lane; there is a 19% possibility that the automobile 70 travels straight and moves to the left-side lane; there is a 50% possibility that the automobile 70 turns left and moves to the right-side lane; and there is a 30% possibility that the automobile 70 turns left and moves to the left-side lane.

Moreover, based on the likelihood with respect to each of the four lanes, the predicting unit 58 identifies one or more target lanes from among the four lanes. For example, the predicting unit 58 identifies the top two lanes, from among the four lanes, as the target lanes. Alternatively, for example, the predicting unit 58 identifies the lanes, from among the four lanes, having the likelihood to be equal to or greater than a threshold value as the target lanes. Then, for each of the one or more identified target lanes, the predicting unit 58 calculates the predicted-state information indicating one or more states of the automobile 70 (the mobile object) attained after the reference time.

Figure 5:
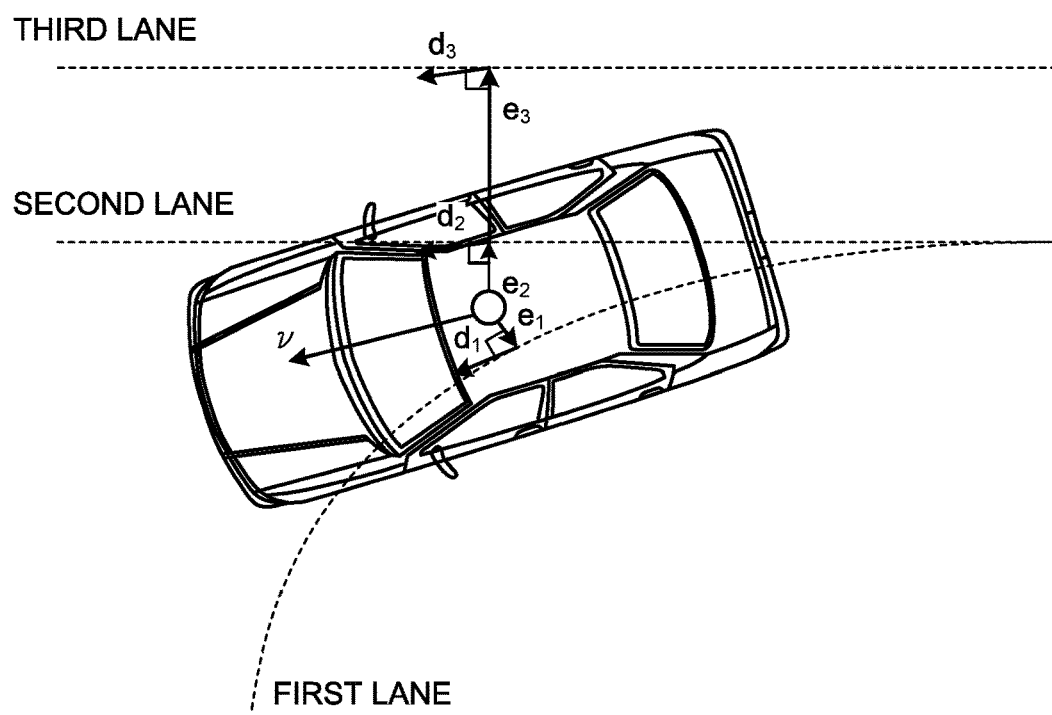
FIG. 5 is a diagram illustrating an example of lane information and current-error information.

FIG. 5 is a diagram illustrating an example of the lane information and current-error information. In the embodiment, the estimating unit 56 calculates, as the current-error information with respect to each of one or more lanes, a position error and an angle error with respect to each of one or more lanes.

For example, assume that a first lane, a second lane, and a third lane represent a plurality of lanes having a possibility that the mobile object moves. In that case, the estimating unit 56 calculates the following errors as the current-error information: a position error $e_1$ and an angle error $d_1$ regarding the first lane; a position error $e_2$ and an angle error $d_2$ regarding the second lane; and a position error $e_3$ and an angle error $d_3$ regarding the third lane.

For example, the position of the foot of a perpendicular that is extended from the center position of the mobile object to the curve representing the concerned lane is assumed to be the foot position. In that case, the estimating unit 56 calculates, as the position error, the vector from the center position of the mobile object to the foot position of the concerned lane. In that case, the estimating unit 56 can express the position error by separating it into an x-direction component and a y-direction component.

For example, the estimating unit 56 calculates, as the angle error, the difference vector between the directional vector of the mobile object and the tangent vector at the foot position in the curve representing the concerned lane. In that case, the estimating unit 56 can express the difference vector by separating it into an x-direction component and a y-direction component.

For example, the estimating unit 56 calculates, as the angle error, the difference vector between the directional vector of the mobile object and the tangent vector at a position separated by a predetermined distance from the foot position in the curve representing the concerned lane. In that case, the estimating unit 56 can express the difference vector by separating it into an x-ray component and a y-ray component. Moreover, it is possible to set a plurality of predetermined distances.

Figure 6:
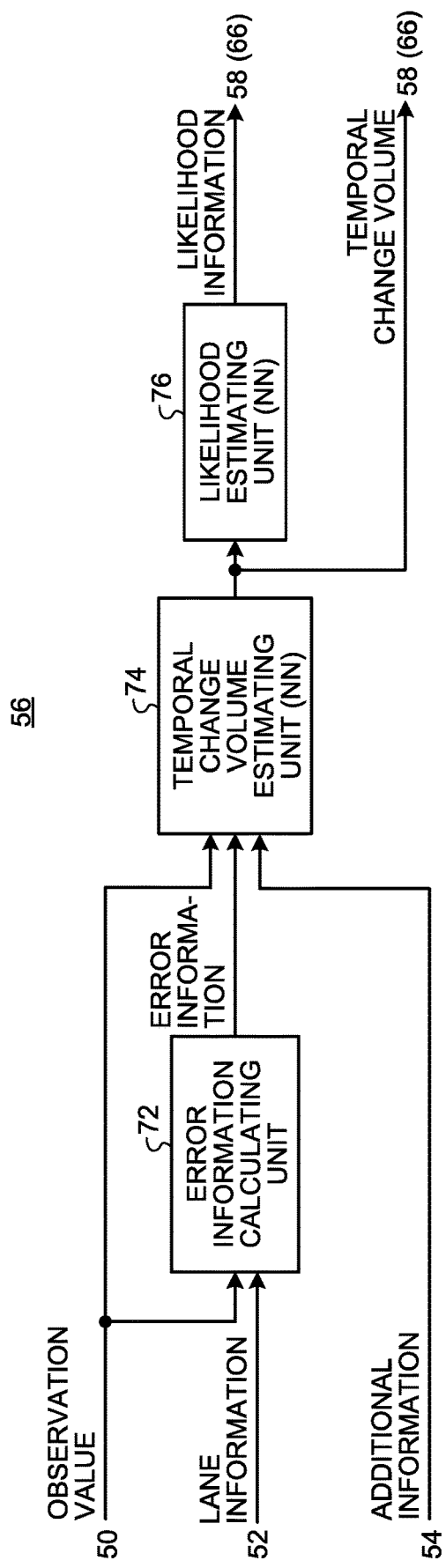
FIG. 6 is a configuration diagram of an estimating unit.

FIG. 6 is a diagram illustrating a configuration of the estimating unit 56. The estimating unit 56 includes an error information calculating unit 72, a temporal change volume estimating unit 74, and a likelihood estimating unit 76.

The error information calculating unit 72 obtains one or more observation values from the observation value obtaining unit 50. In the embodiment, the error information calculating unit 72 obtains temporal data of observation values that indicates one or more observation values obtained at predetermined time intervals. Moreover, the error information calculating unit 72 receives lane information.

Based on the temporal data of observation values and the lane information, the error information calculating unit 72 calculates, with respect to each of a plurality of lanes, temporal data of error information indicating the error between the mobile object and the concerned lane at predetermined time intervals. For example, regarding each of a plurality of lanes, the error information calculating unit 72 calculates the position error and the angle error as illustrated in FIG. 5. Then, the error information calculating unit 72 sends the temporal data of error information to the temporal change volume estimating unit 74.

Based on the temporal data of observation values, the temporal data of error information, and the temporal data of additional information; the temporal change volume estimating unit 74 estimates the temporal change volume from a time prior to the reference time to the reference time.

In the embodiment, the temporal change volume estimating unit 74 calculates the temporal change volume using a first recurrent neural network. For example, the first recurrent neural network treats the temporal data of observation values, the temporal data of error information, and the temporal data of additional information as input; and outputs the temporal change volume.

For example, the temporal change volume estimating unit 74 can use, as the first recurrent neural network, a simple recurrent neural network (RNN) including a simple recurrent network or can use an RNN including a long short-term memory (LSTM) or a gated recurrent unit (GRU). The temporal change volume estimating unit 74 sends the temporal change volume to the likelihood estimating unit 76 and the predicting unit 58.

For example, the temporal change volume estimating unit 74 can input, corresponding to each of a plurality of lanes, temporal data of one-dimensional vector data expressed as given below in Equation (1).

$$\hat{x} = [x, y, v_x, v_y, e_x, e_y, d_x, d_y, \hat{s}]^T \quad (1)$$

In Equation (1), $\hat{x}$ represents the vector data input to the temporal change volume estimating unit 74. Moreover, x represents the position of the mobile object in the x-direction as obtained from the observation value obtaining unit 50. Furthermore, y represents the position of the mobile object in the y-direction as obtained from the observation value obtaining unit 50. Moreover, $v_x$ represents the velocity of the mobile object in the x-direction as obtained from the observation value obtaining unit 50. Furthermore, $v_y$ mobile object in the y-direction as obtained from the observation value obtaining unit 50.

Moreover, $e_x$ represents the position error of the mobile object in the x-direction with respect to the concerned lane as calculated by the error information calculating unit 72. Furthermore, $e_y$ represents the position error of the mobile object in the y-direction with respect to the concerned lane as calculated by the error information calculating unit 72. Moreover, $d_x$ represents the angle error of the mobile object in the x-direction with respect to the concerned lane as calculated by the error information calculating unit 72. Furthermore, $d_y$ represents the angle error of the mobile object in the y-direction with respect to the concerned lane as calculated by the error information calculating unit 72.

Moreover, $\hat{s}$ represents traffic light information included in the additional information. For example, in the traffic light information, the states of the traffic light, namely, red, yellow, and green are expressed using one-hot expressions.

The temporal change volume estimating unit 74 treats the temporal data of vectors, as given in Equation (1), as input in a corresponding manner to each of a plurality of lanes. Alternatively, the temporal change volume estimating unit 74 can treat, as input, temporal data of a single two-dimensional vector formed by synthesizing a plurality of vectors corresponding to a plurality of lanes.

Meanwhile, the temporal change volume estimating unit 74 is not limited to treat, as input, the vector as given in Equation (1), and can alternatively treat vectors of different configurations as input. For example, the temporal change volume estimating unit 74 can treat, as input, a vector that includes the acceleration, the angular velocity, and the angular acceleration expressed by separating them into x-direction components and y-direction components. Alternatively, instead of the acceleration, the angular velocity, and the angular acceleration expressed by separating them into x-direction components and y-direction components; the temporal change volume estimating unit 74 can treat, as input, a vector including the acceleration, the angular velocity, and the angular acceleration expressed as scalar values.

Still alternatively, instead of using the position error and the angle error expressed by separating them into x-direction components and y-direction components; the temporal change volume estimating unit 74 can treat, as input, a vector including the position error and the angle error expressed as scalar values. Still alternatively, the temporal change volume estimating unit 74 can treat, as input, a vector further including information indicating the error from the boundary between lanes and information indicating the error from the footpath. Still alternatively, the temporal change volume estimating unit 74 can treat, as input, a vector that further includes direction instruction information that indicates the travel direction of the mobile object and that is expressed using one-hot expressions.

The likelihood estimating unit 76 obtains the temporal change volume estimated by the temporal change volume estimating unit 74. Then, the likelihood estimating unit 76 concatenates the temporal change volume corresponding to each of plurality of lanes, and estimates the likelihood information indicating the likelihood of each of a plurality of lanes.

In the embodiment, the likelihood estimating unit 76 calculates the likelihood information using a neural network. For example, the likelihood estimating unit 76 uses a neural network including a fully-connected layer that treats, as input, the value obtained by concatenating a plurality of temporal change volumes corresponding to a plurality of lanes. Alternatively, the likelihood estimating unit 76 can use the Softmax function in the activating functions of the output layer and can output the probability for each of a plurality of lanes. Still alternatively, the likelihood estimating unit 76 can use the Sigmoid function in the activating functions of the output layer and can output a value between "0" and "1" from each node of the output layer.

The likelihood estimating unit 76 sends the estimated likelihood information to the masking unit 66 of the predicting unit 58. The likelihood estimating unit 76 estimates the likelihood information at predetermined time intervals, and sends it to the predicting unit 58.

Figure 7:
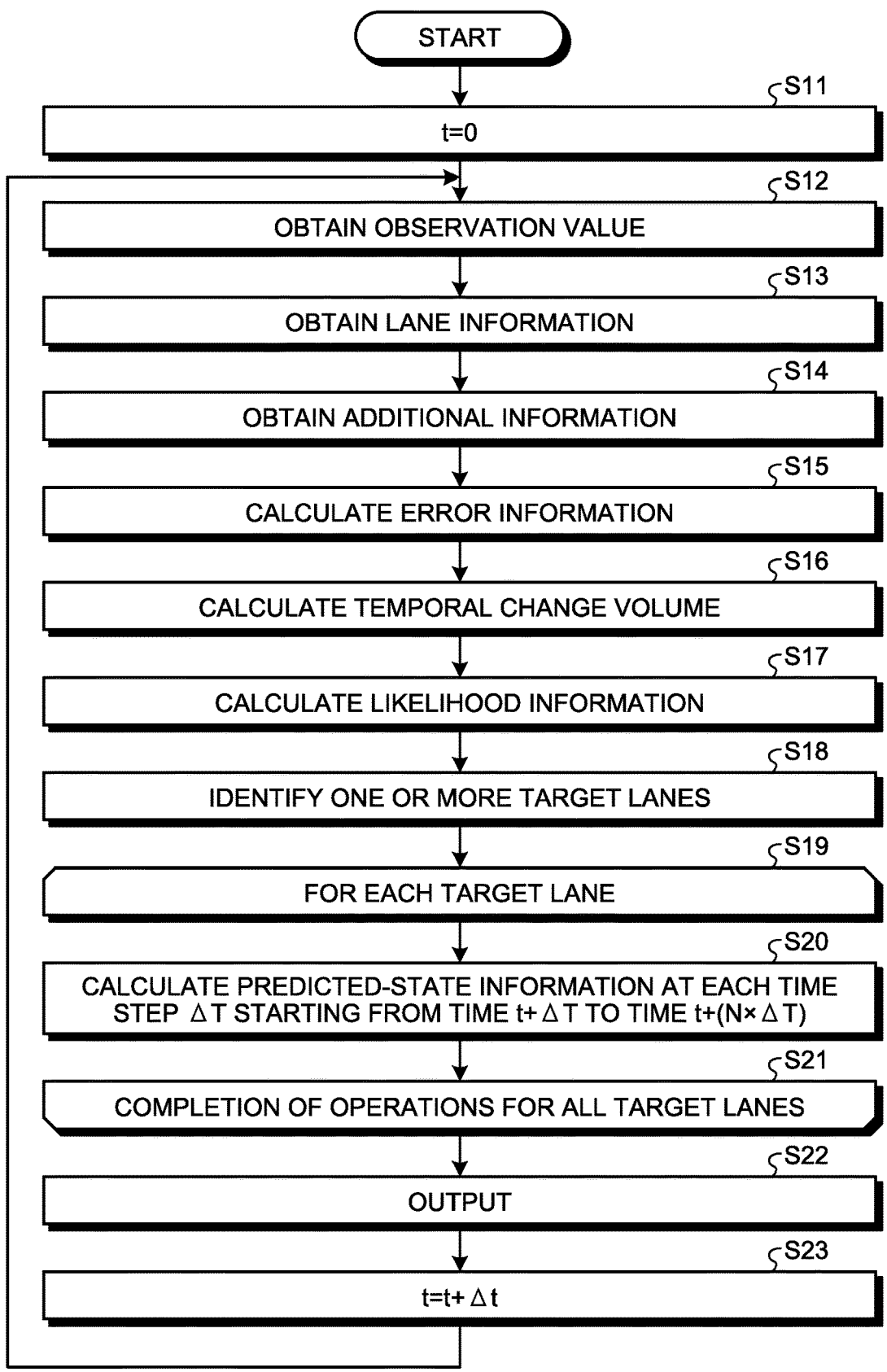
FIG. 7 is a flowchart for explaining a flow of operations performed in the prediction device.

FIG. 7 is a flowchart for explaining a flow of operations performed in the prediction device 40. When a mobile object (such as another vehicle) is detected, the prediction device 40 performs operations with respect to the detected mobile object according to the flow illustrated in FIG. 7.

Firstly, at S11, the prediction device 40 substitutes "0" in a variable t that represents the reference time (the current time). Then, at S12, the observation value obtaining unit 50 obtains temporal data of observation values. Subsequently, at S13, the lane information obtaining unit 52 obtains lane information. Then, at S14, the additional information obtaining unit 54 obtains temporal data of additional information.

Subsequently, at S15, the estimating unit 56 calculates, with respect to each of a plurality of lanes having a possibility that the mobile object moves after the reference time, temporal data of error information indicating the error of the mobile object. Then, at S16, the estimating unit 56 calculates the temporal change volume indicating the features of the state of the mobile object with respect to each of a plurality of lanes. Subsequently, at S17, the estimating unit 56 estimates the likelihood information indicating the likelihood that the mobile object goes on each of a plurality of lanes.

Then, at S18, based on the likelihood information, the predicting unit 58 identifies one or more target lanes from among a plurality of lanes. For example, the predicting unit 58 identifies, from among a plurality of lanes, one or more lanes having the likelihood to be equal to or greater than a predetermined value as one or more target lanes. Alternatively, for example, the predicting unit 58 identifies, from among a plurality of lanes, one or more lanes corresponding to a predetermined number of likelihoods from the top as one or more target lanes.

Then, the predicting unit 58 performs the operation at S20 with respect each of one or more identified target lanes (loop operation from S19 to S21). At S20, based on the temporal change volume with respect to the concerned lane, based on the current-state information, and based on the individual lane information representing the concerned lane as included in the lane information; the predicting unit calculates predicted-state information indicating one or more states of the mobile object attained after the reference time when the mobile object moves to the concerned target lane.

In the embodiment, at S20, the predicting unit 58 calculates the predicted-state information corresponding to each of a plurality of times at predetermined time steps ($\Delta T$). More specifically, the predicting unit 58 calculates the predicted-state information corresponding to each of N number of times starting from a time (t+$\Delta T$) arriving after a single time step from the reference time to the last time (t+N×$\Delta T$) arriving after N number of steps (where N is an integer equal to or greater than two) from the reference time. Herein, the predicting unit 58 calculates the predicted-state information using a Kalman filter. Regarding the operation performed at S20 using a Kalman filter, further explanation is given later with reference to FIG. 11.

After the operation at S20 is performed for all target lanes; at S22, the output unit 60 outputs, regarding each of one or more identified target lanes, the predicted-state information indicating one or more states of the mobile object attained after the reference time. The output unit 60 displays the predicted-state information in the display device 23, and sends it to the vehicle control device 26.

Subsequently, at S23, if the number of time steps at which the operations from S11 to S22 are performed for the detected mobile object is equal to or smaller than K (where K is a predetermined integer), then the prediction device 40 increments the variable t by $\Delta t$ that represents a certain period of time. Then, the system control returns to S12; and, after the elapse of the time period $\Delta t$, the prediction device 40 again performs the operations for the detected mobile object from S12 onward.

Figure 8:
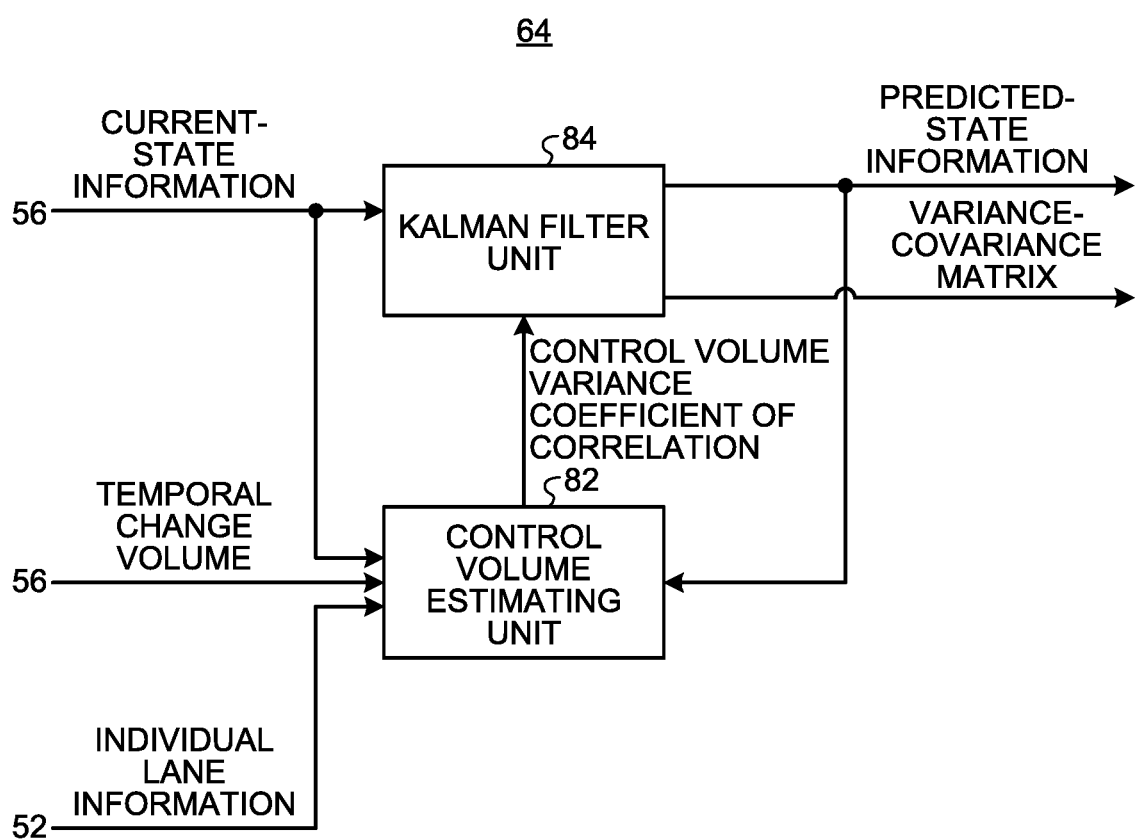
FIG. 8 is a configuration diagram of a state predicting unit.

FIG. 8 is a diagram illustrating a configuration of the state predicting unit 64. The predicting unit 58 includes one or more state predicting units 64 corresponding to one or more target lanes. In the embodiment, each state predicting unit 64 uses a Kalman filter and sequentially calculates predicted-state information and a variance-covariance matrix at each time step starting from a first time (t+$\Delta T$) arriving after a single time step from the reference time (t) to the last time (t+N×$\Delta T$) arrived after the predetermined number of steps (N) from the reference time.

The variance-covariance matrix is a matrix including variance and covariance. The covariance represents the index indicating the relationship between any two states included in the predicted-state information. For example, the covariance between a first state and a second state can be calculated based on the coefficient of correlation between the first state and the second state, the variance of the first state, and the variance of the second state.

Each state predicting unit 64 includes a control volume estimating unit 82 and a Kalman filter unit 84.

The control volume estimating unit 82 obtains, from the estimating unit 56 via the masking unit 66, the temporal change volume in the concerned lane. Moreover, the control volume estimating unit 82 obtains, from the observation value obtaining unit 50 via the masking unit 66, the current-state information (information indicating one or more states of the mobile object represented by a plurality of observation values obtained at the reference time). Furthermore, the control volume estimating unit 82 obtains, from the lane information obtaining unit 52 via the masking unit 66, the individual lane information regarding the concerned lane as included in the lane information.

Moreover, at each of a plurality of times at each predetermined time step after the reference time, the control volume estimating unit 82 obtains the predicted-state information at the previous time step from the Kalman filter unit 84. Then, for each of a plurality of times at each predetermined time step after the reference time, the control volume estimating unit 82 estimates the control volume to be applied to the mobile object for enabling it to go on the concerned target lane; estimates the variance of the control volume; and estimates the coefficient of correlation. Meanwhile, instead of outputting the variance of the control volume and the coefficient of correlation, the control volume estimating unit 82 can output the covariance of the control volume.

Herein, the control volume represents the value applied to the mobile object in order to control at least one of the position, the velocity, the acceleration, the angular velocity, and the angular acceleration of the mobile object. The coefficient of correlation represents a coefficient indicating the correlation between two control volumes.

The Kalman filter unit 84 obtains the current-state information from the observation value obtaining unit 50 via the masking unit 66. Moreover, at each of a plurality of times at each predetermined time step after the reference time, the Kalman filter unit 84 obtains the control volume, the variance of the control volume, and the coefficient of correlation from the control volume estimating unit 82. Meanwhile, instead of obtaining the variance of the control volume and the coefficient of correlation, the Kalman filter unit 84 can obtain the covariance of the control volume. Then, for each of a plurality of times at each predetermined time step after the reference time, the Kalman filter unit 84 calculates predicted-state information and a variance-covariance matrix using the Kalman filter.

In the embodiment, the control volume estimating unit 82 obtains the following information of the mobile object as the current-state information: the position in the x-direction; the position in the y-direction; the velocity in the x-direction; the velocity in the y-direction; the acceleration in the x-direction; the acceleration in the y-direction; the variance of the position in the x-direction; the variance of the position in the y-direction; the variance of the velocity in the x-direction; the variance of the velocity in the y-direction; the variance of the acceleration in the x-direction; and the variance of the acceleration in the y-direction. Moreover, in the embodiment, the control volume estimating unit 82 estimates the following: the x-direction velocity control volume for controlling the velocity in the x-direction; the y-direction velocity control volume for controlling the velocity in the y-direction; the variance of the x-direction velocity control volume; the variance of the y-direction velocity control volume; and the coefficient of correlation indicating the correlation between the x-direction velocity control volume and the y-direction velocity control volume. Meanwhile, instead of outputting the variance of the x-direction velocity control volume; the variance of the y-direction velocity control volume; and the coefficient of correlation indicating the correlation between the x-direction velocity control volume and the y-direction velocity control volume; the control volume estimating unit 82 can output the covariance between the x-direction velocity control volume and the y-direction velocity control volume.

In the embodiment, the Kalman filter unit 84 obtains the following information of the mobile object as the current-state information: the position in the x-direction; the position in the y-direction; the velocity in the x-direction; the velocity in the y-direction; the acceleration in the x-direction; the acceleration in the y-direction; the variance of the position in the x-direction; the variance of the position in the y-direction; the variance of the velocity in the x-direction; the variance of the velocity in the y-direction; the variance of the acceleration in the x-direction; and the variance of the acceleration in the y-direction. Moreover, in the embodiment, the Kalman filter unit 84 estimates, as the predicted-state information, the following information of the mobile object: the position in the x-direction; the position in the y-direction; the velocity in the x-direction; the velocity in the y-direction; the acceleration in the x-direction; the acceleration in the y-direction; the variance of the position in the x-direction; the variance of the position in the y-direction; the variance of the velocity in the x-direction; the variance of the velocity in the y-direction; the variance of the acceleration in the x-direction; and the variance of the acceleration in the y-direction. Furthermore, in the embodiment, the Kalman filter unit 84 estimates the covariance between the position in the x-direction and the position in the y-direction of the mobile object; estimates the covariance between the velocity in the x-direction and the velocity in the y-direction of the mobile object; and estimates the covariance between the acceleration in the x-direction and the acceleration in the y-direction of the mobile object.

Figure 9:
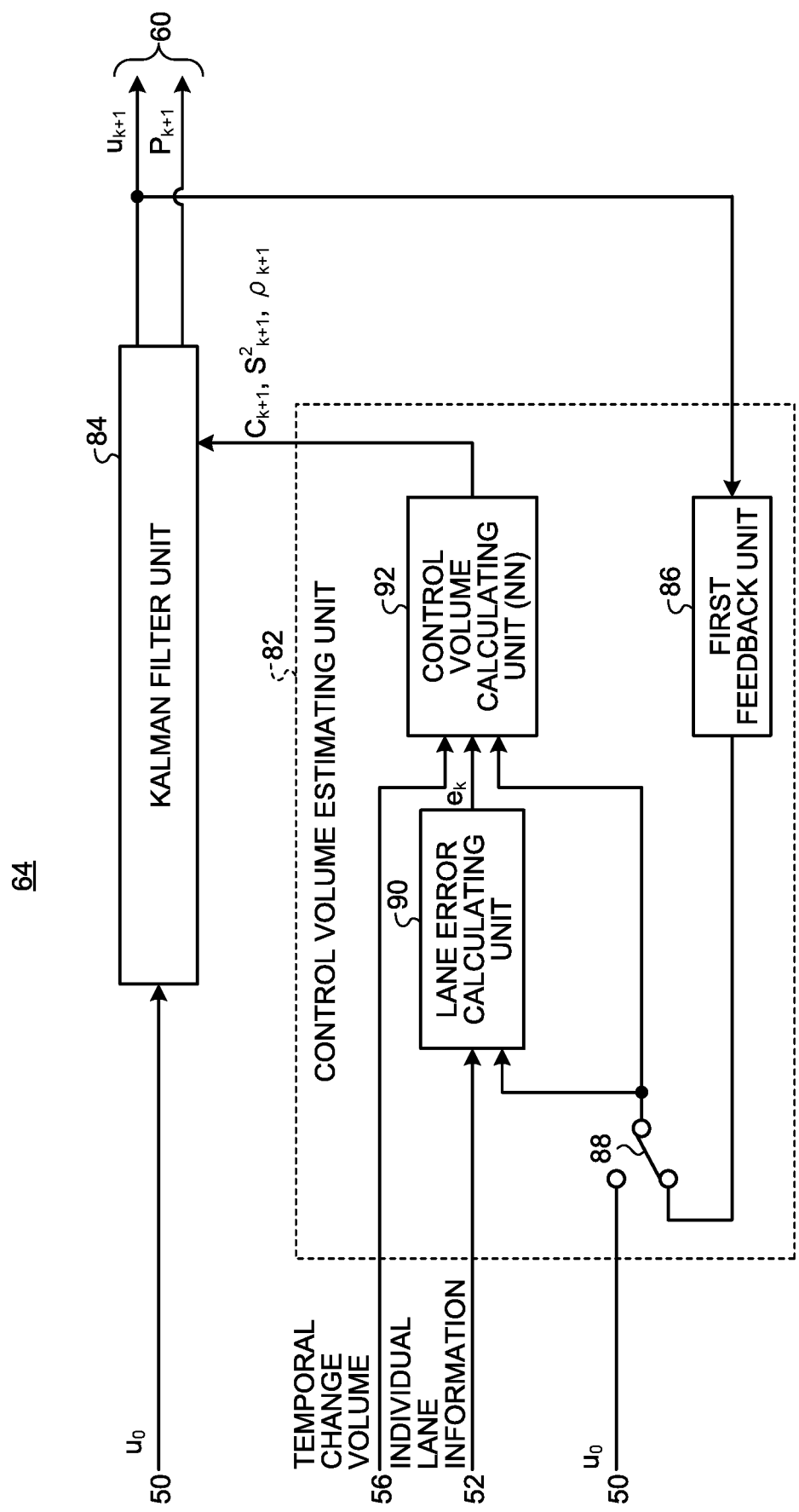
FIG. 9 is a diagram illustrating a configuration of a control volume estimating unit, along with illustrating a Kalman filter unit.

FIG. 9 is a diagram illustrating a configuration of the control volume estimating unit 82, along with illustrating the Kalman filter unit 84. The control volume estimating unit 82 includes a first feedback unit 86, a first selector 88, a lane error calculating unit 90, and a control volume calculating unit 92.

In the case of calculating a control volume ($C_{k+1}$), a variance ($S^2_{k+1}$), and a coefficient of correlation ($\rho_{k+1}$) at the target time; the first feedback unit 86 obtains, from the Kalman filter unit 84, predicted-state information ($u_k$) corresponding to the time at the previous time step of the target time. Then, the first feedback unit 86 sends the predicted-state information ($u_k$) corresponding to the time at the previous time step of the target time to the first selector 88.

In the case of calculating the control volume as well as calculating the variance of the control volume and the coefficient of correlation at the first time arriving after a single time step from the reference time, the first selector 88 selects current-state information ($u_0$) and sends it to the lane error calculating unit 90 and the control volume calculating unit 92.

In the case of calculating the control volume at an arbitrary second time arriving after two time steps from the reference time as well as calculating the variance of the control volume and the coefficient of correlation, the first selector 88 selects the predicted-state information ($u_k$) that is fed back by the first feedback unit 86 and sends it to the lane error calculating unit 90 and the control volume calculating unit 92. That is, the first selector 88 selects the predicted-state information ($u_k$) corresponding to the time at the previous time step of the second time as calculated by the Kalman filter unit 84, and sends the predicted-state information ($u_k$) to the control volume calculating unit 92.

The lane error calculating unit 90 obtains the individual lane information about the concerned lane as included in the lane information received from the lane information obtaining unit 52. Based on the predicted-state information ($u_k$) corresponding to the time at the previous time step of the target time and based on the individual lane information, the lane error calculating unit 90 calculates predicted-error information ($e_k$) indicating the error between the mobile object and the concerned lane at the time at the previous time step of the target time. For example, in an identical manner to the operations performed by the error information calculating unit 72 as illustrated in FIG. 6, the lane error calculating unit 90 calculates the predicted-error information ($e_k$).

Then, the lane error calculating unit 90 sends the calculated predicted-error information ($e_k$) to the control volume calculating unit 92.

Based on the temporal change volume of the concerned lane and based on the current-state information ($u_0$) and current-error information ($e_0$) obtained by the observation value obtaining unit 50, the control volume calculating unit 92 estimates the control volume at the first time arriving after a single time step from the reference time and estimates the variance of the control volume and the coefficient of correlation. Moreover, based on the temporal change volume of the concerned lane and based on the predicted-state information ($u_k$) and the predicted-error information ($e_k$) corresponding to the time at the previous time step of an arbitrary second time arriving after two steps onward from the reference time, the control volume calculating unit 92 estimates the control volume at the second time and estimates the variance of the control volume and the coefficient of correlation.

In the embodiment, the control volume calculating unit 92 uses a neural network and calculates the control volume, the variance of the control volume, and the coefficient of correlation. For example, the control volume calculating unit 92 uses a second recurrent neural network and calculates the control volume, the variance of the control volume, and the coefficient of correlation. The second recurrent neural network treats, as input, the temporal change volume in the concerned lane, the current-state information (or the predicted-state information), and the current-error information (or the predicted-error information); and outputs the control volume, the variance of the control volume, and the coefficient of correlation. As the second recurrent neural network, for example, the control volume calculating unit 92 can use a simple RNN or an RNN including an LSTM or a GRU. Moreover, in the second recurrent neural network, the output layer can be a fully-connected layer.

In the embodiment, the control volume estimating unit 82 estimates the x-direction velocity control volume; the y-direction velocity control volume; the variance of the x-direction velocity control volume; the variance of the y-direction velocity control volume; and the coefficient of correlation. In that case, for example, the "exp" function is implemented as the activating function of the node that outputs the variance of the x-direction velocity control volume and the variance of the y-direction velocity control volume. As a result, the control volume calculating unit 92 becomes able to output a value equal to or greater than zero as the variance of the velocity control volume. Moreover, for example, the "tank" function is implemented as the activating function of the node that outputs the coefficient of correlation. As a result, the control volume calculating unit 92 becomes able to output a value greater than −1 and smaller than +1 as the coefficient of correlation.

At every time step, the control volume calculating unit 92 sends the control volume ($C_{k+1}$), the variance ($S^2_{k+1}$) of the control volume, and the coefficient of correlation ($\rho_{k+1}$) to the Kalman filter unit 84.

Figure 10:
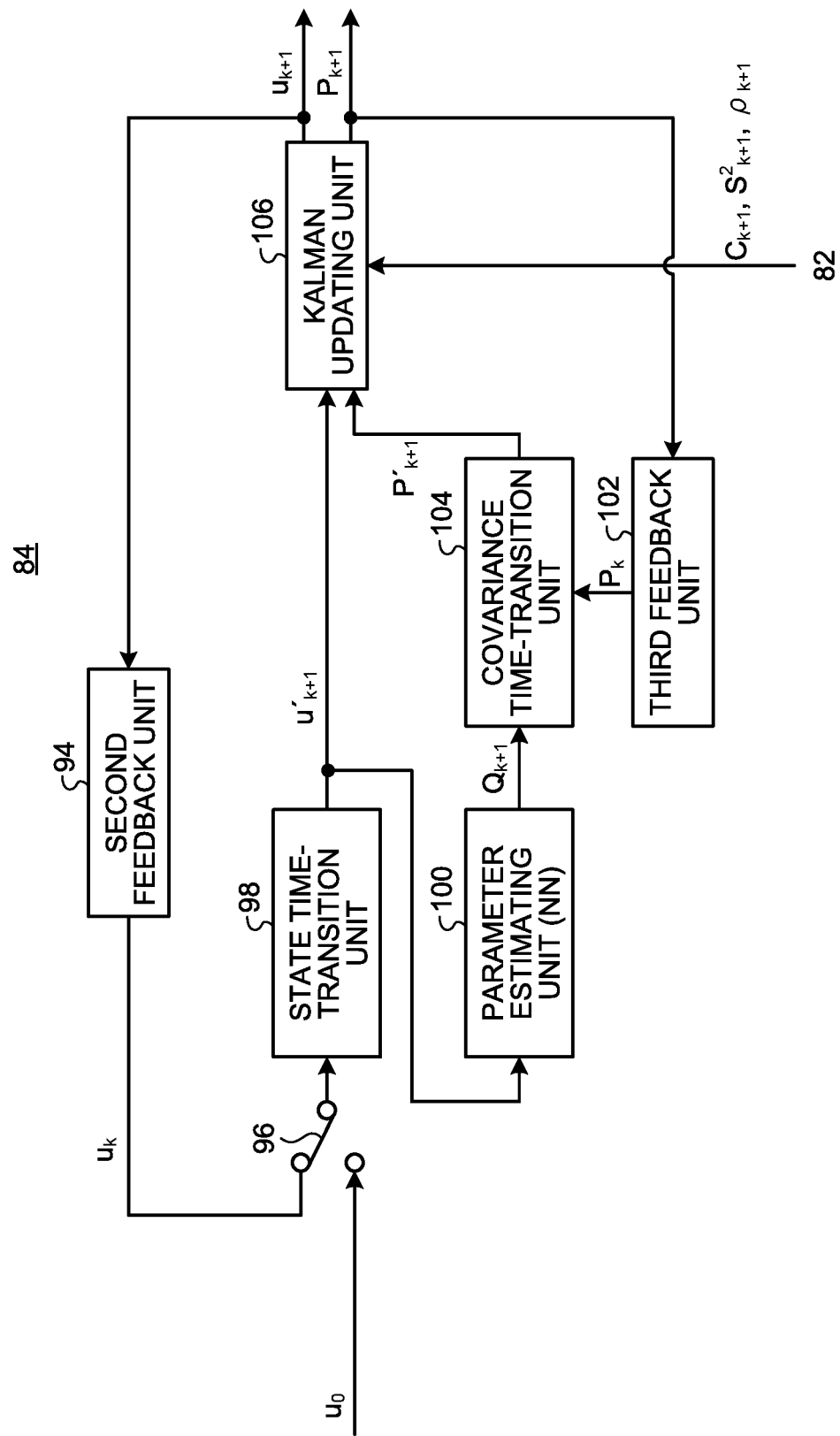
FIG. 10 is a configuration diagram of the Kalman filter unit.

FIG. 10 is a diagram illustrating a configuration of the Kalman filter unit 84. The Kalman filter unit 84 includes a second feedback unit 94, a second selector 96, a state time-transition unit 98, a parameter estimating unit 100, a third feedback unit 102, a covariance time-transition unit 104, and a Kalman updating unit 106.

In the case of calculating predicted-state information ($u_{k+1}$) and a variance-covariance matrix ($P_{k+1}$) at the target time, the second feedback unit 94 obtains the predicted-state information ($u_k$) corresponding to the time at the previous time step of the target time. Then, the second feedback unit 94 sends, to the second selector 96, the predicted-state information ($u_k$) corresponding to the time at the previous time step of the target time.

In the case of calculating the predicted-state information and the variance-covariance matrix at the first time arriving after a single time step from the reference time, the second selector 96 selects the current-state information ($u_0$) obtained by the observation value obtaining unit 50 and sends it to the state time-transition unit 98. In the case of calculating the predicted-state information and the variance-covariance matrix at an arbitrary second time arriving after two time steps onward from the reference time, the second selector 96 selects the predicted-state information ($u_k$) fed back by the second feedback unit 94 and sends it to the state time-transition unit 98. That is, in that case, the second selector 96 selects the predicted-state information ($u_k$) corresponding to the time at the previous time step of the second time as calculated by the Kalman updating unit 106, and sends the predicted-state information ($u_k$) to the state time-transition unit 98.

In the case of calculating the predicted-state information and the variance-covariance matrix at the first time arriving after a single time step from the reference time, the state time-transition unit 98 performs time transition of the current-state information ($u_0$) by one time step using a predetermined time transition model. In the case of calculating the predicted-state information and the variance-covariance matrix at an arbitrary second time arriving after the second time step onward from the reference time, the state time-transition unit 98 performs time transition of the predicted-state information ($u_k$), which corresponds to the time at the previous time step of the second time, by one time step using a predetermined time transition model.

For example, the state time-transition unit 98 performs calculation as given below in Equation (2).

$$u'_{k+1} = F(u_k) \qquad (2)$$

Herein, $u_k$ represents the predicted-state information (or the current-state information) at the previous time step of the target time. Moreover, $u'_{k+1}$ represents the information obtained as a result of performing time transition of the predicted-state information $u_k$ by one time step using a time transition model.

Furthermore, F( ) represents a model related to the time transition of the system. For example, under the assumption that the mobile object performs a uniform motion or a uniform accelerated motion, based on the state of the mobile object at an arbitrary time, the function F( ) enables calculation of the state of the mobile object corresponding to the time at the previous time step of the arbitrary time. Meanwhile, the state time-transition unit 98 sends the calculated information ($u'_{k+1}$) to the parameter estimating unit 100 and the Kalman updating unit 106.

The parameter estimating unit 100 estimates a parameter ($Q_{k+1}$) that is included in the time transition model for performing time transition, by one time step, of the variance-covariance matrix at an arbitrary time. The parameter ($Q_{k+1}$) represents the process noise that gets added to the time transition model.

In the embodiment, the parameter estimating unit 100 calculates the parameter ($Q_{k+1}$) using a neural network. For example, the parameter estimating unit 100 uses a recurrent neural network; treats, as input, the information ($u'_{k+1}$) output from the state time transition unit 98; and outputs the parameter ($Q_{k+1}$). As the recurrent neural network, for example, the parameter estimating unit 100 can use a simple RNN or an RNN including an LSTM or a GRU.

In the embodiment, for example, the parameter estimating unit 100 calculates the following information as the parameter ($Q_{k+1}$): the variance of the position in the x-direction; the variance of the position in the y-direction; the variance of the velocity in the x-direction; the variance of the velocity in the y-direction; the variance of the acceleration in the x-direction; the variance of the acceleration in the y-direction; the coefficient of correlation between the position in the x-direction and the position in the y-direction; the coefficient of correlation between the velocity in the x-direction and the velocity in the y-direction; and the coefficient of correlation between the acceleration in the x-direction and the acceleration in the y-direction.

Meanwhile, in the parameter estimating unit 100, the output layer can be a fully-connected layer. Moreover, for example, in the parameter estimating unit 100, the "exp" function is implemented as the activating function of the node that outputs the variance. Furthermore, for example, in the parameter estimating unit 100, the "tank" function is implemented as the activating function of the node that outputs the coefficient of correlation. The parameter estimating unit 100 sends the estimated parameter ($Q_{k+1}$) to the covariance time-transition unit 104.

In the case of calculating the predicted-state information ($u_{k+1}$) and the variance-covariance matrix ($P_{k+1}$) at the target time, the third feedback unit 102 obtains, from the Kalman updating unit 106, a variance-covariance matrix ($P_k$) corresponding to the time at the previous time step of the target time. Then, the third feedback unit 102 sends the variance-covariance matrix ($P_k$), which corresponds to the time at the previous time step of the target time, to the covariance time-transition unit 104.

In the case of calculating the predicted-state information ($u_{k+1}$) and the variance-covariance matrix ($P_{k+1}$) at the target time, the covariance time-transition unit 104 performs time transition of the variance-covariance matrix ($P_k$), which corresponds to the time at the previous time step of the target time, by one time step using a predetermined time transition model.

For example, the covariance time-transition unit 104 performs calculation as given below in Equation (3).

$$P'_{k+1} = FP_k F^T + Q_{k+1} \qquad (3)$$

Herein, $P_k$ represents the variance-covariance matrix at the previous time step of the target time. Moreover, $P'_{k+1}$ represents the information obtained as a result of performing time transition of the variance-covariance matrix $P_k$ by one time step using a time transition model.

Equation (3) represents a model related to the time transition of the system. For example, according to Equation (3), the variance-covariance matrix ($P_k$) corresponding to the time at the previous time step is subjected to time transition using a linear model, and the process noise based on the parameter ($Q_{k+1}$) is added. Then, the covariance time transition unit 104 sends the information ($P'_{k+1}$), which is obtained as a result of performing time transition of the variance-covariance matrix ($P_k$) by one time step, to the Kalman updating unit 106.

The Kalman updating unit 106 obtains the information ($u'_{k+1}$) that is obtained as a result of performing time transition of the predicted-state information ($u_k$) (or the current-state information ($u_0$)) by one time step; and obtains the information ($P'_{k+1}$) that is obtained as a result of performing time transition of the variance-covariance matrix ($P_k$) by one time step. Moreover, the Kalman updating unit 106 obtains, from the control volume estimating unit 82, the control volume ($C_{k+1}$), the variance ($S^2_{k+1}$) of the control volume, and the coefficient of correlation ($\rho_{k+1}$) at the target time.

Based on such obtained information, the Kalman updating unit 106 performs a Kalman updating operation based on an identical calculating formula to a commonly-used Kalman filter, and calculates the predicted-state information ($u_{k+1}$) and the variance-covariance matrix ($P_{k+1}$) at the target time. Then, the Kalman updating unit 106 outputs the predicted-state information ($u_{k+1}$) and the variance-covariance matrix ($P_{k+1}$). For example, the Kalman updating unit 106 outputs the collection of predicted-state information and the collection of variance-covariance matrices starting from the first time ($t+\Delta T$) arriving after the first time step from the reference time to the last time ($t+N \times \Delta T$) arriving after the predetermined number of time steps (N).

Meanwhile, instead of predicting the states using a Kalman filter, it is possible to use an extended Kalman filter. When an extended Kalman filter is used, "F" in Equation (3) is replaced with a matrix obtained by substituting $u_k$ in the Jacobian matrix of "F". The other calculations are identical to the explanation given earlier.

Figure 11:
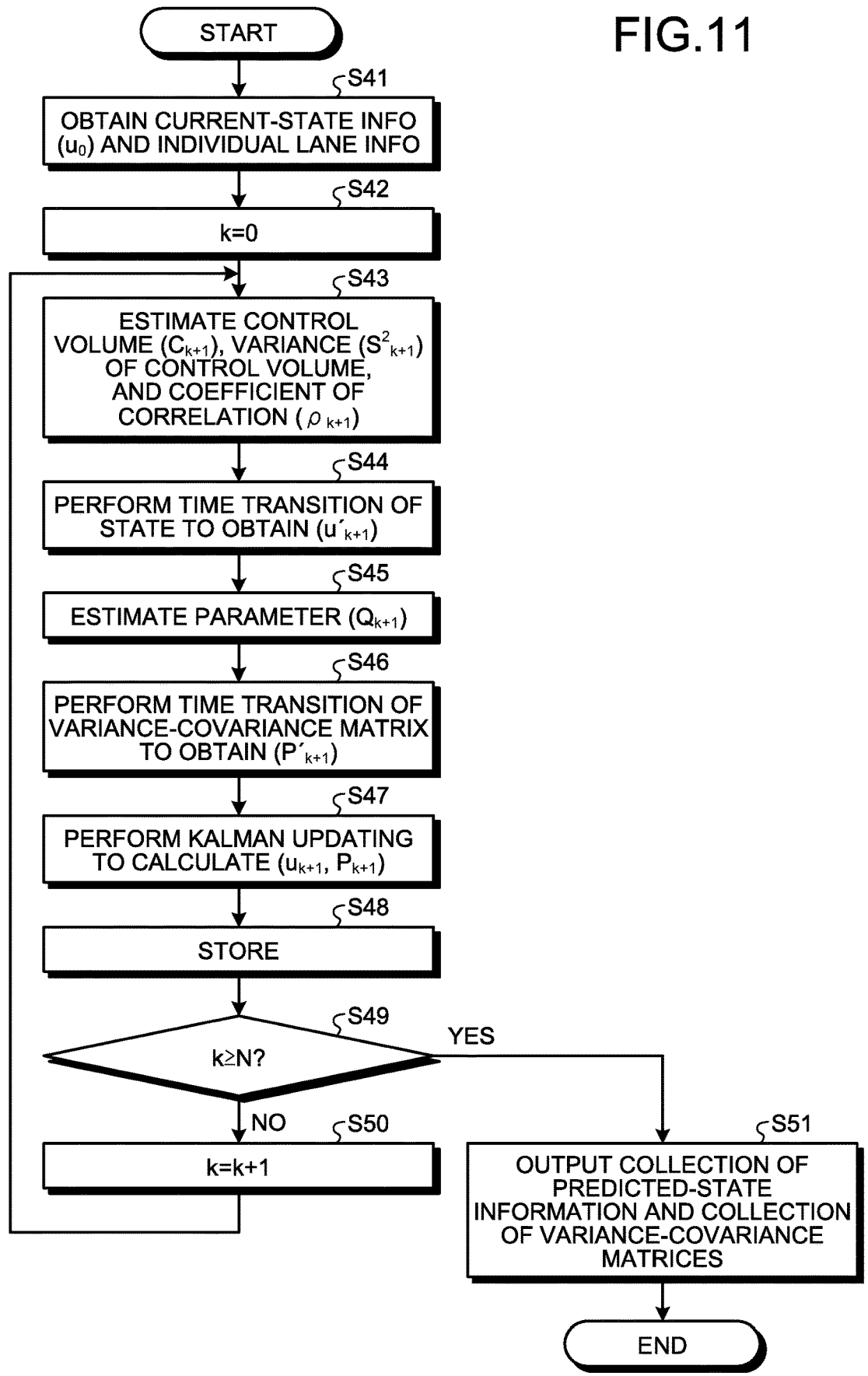
FIG. 11 is a flowchart for explaining a flow of operations performed by the state predicting unit.

FIG. 11 is a flowchart for explaining a flow of operations performed by the state predicting unit 64. Thus, the state predicting unit 64 performs operations according to the flow illustrated in FIG. 11.

Firstly, at S41, the state predicting unit 64 obtains the current-state information ($u_0$) from the observation value obtaining unit 50. Moreover, the state predicting unit 64 obtains the temporal change volume from the estimating unit 56. Furthermore, the state predicting unit 64 obtains the individual lane information from the lane information obtaining unit 52. Then, at S42, the state predicting unit 64 substitutes "0" in the count k.

Subsequently, at S43, the control volume estimating unit 82 estimates the control volume ($C_{k+1}$), the variance ($S^2_{k+1}$) of the control volume, and the coefficient of correlation ($\rho_{k+1}$) at the target time. Then, at S44, the Kalman filter unit 84 calculates the information ($u'_{k+1}$) obtained as a result of performing time transition, by one time step, of the predicted-state information ($u_k$) (or the current-state information ($u_0$)) at the previous time step of the target time.

Subsequently, at S45, the Kalman filter unit 84 estimates the parameter ($Q_{k+1}$). Then, at S46, the Kalman filter unit 84 calculates the information ($P'_{k+1}$) obtained as a result of performing time transition of the variance-covariance matrix ($P_k$) corresponding to the previous time step of the target time. Subsequently, at S47, the Kalman filter unit 84 performs Kalman updating and calculates the predicted-state information ($u_{k+1}$) and the variance-covariance matrix ($P_{k+1}$) at the target time.

Then, at S48, the state predicting unit 64 stores the predicted-state information ($u_{k+1}$) and the variance-covariance matrix ($P_{k+1}$) at the target time. Subsequently, at S49, the state predicting unit 64 determines whether the count k has become equal to or greater than N. If the count k is not yet equal to or greater than N (No at S49), then the system control proceeds to S50. At S50, the state predicting unit 64 increments the count k by one, and the system control returns to S43. Then, the state predicting unit 64 again performs the operations from S43 onward.

When the count k is equal to or greater than N (Yes at S49), the system control proceeds to S51. At S51, the state predicting unit 64 outputs the collection of predicted-state information and the collection of variance-covariance matrices starting from the first time ($t+\Delta T$) arriving after the first time step from the reference time to the last time ($t+N \times \Delta T$) arriving after the predetermined number of time steps (N).

Figure 12:
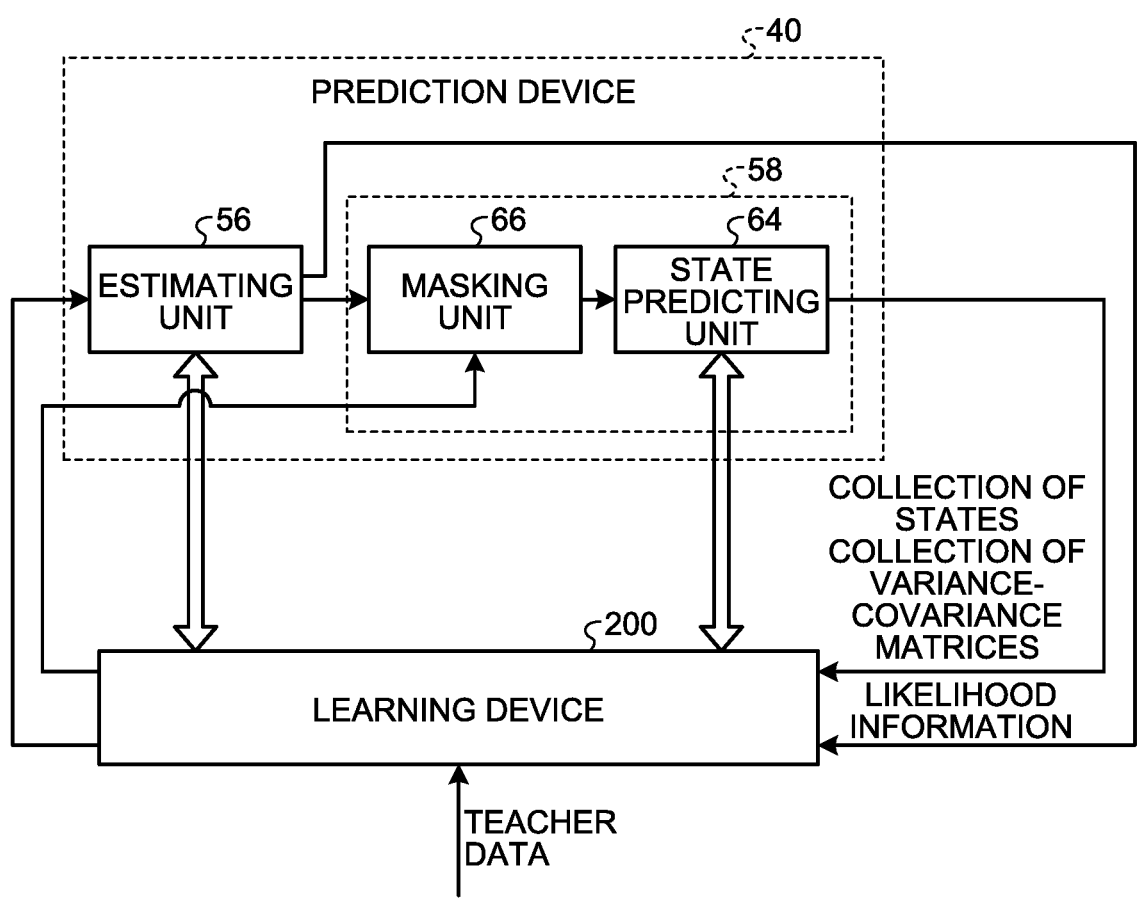
FIG. 12 is a diagram illustrating a configuration of the prediction device at the time of learning, along with illustrating a learning device.

FIG. 12 is a diagram illustrating a configuration of the prediction device 40 at the time of learning, along with illustrating a learning device 200. Before starting to use the prediction device 40, the learning device 200 practices the prediction device 40.

The learning device 200 controls, for example, the masking unit 66 in such a way that one of the state predicting units 64 is selected. In the state in which one of the state predicting units 64 is selected, the learning device 200 practices the prediction device 40 and then copies, in the other state predicting units 64, the internal parameters (coefficients and offsets) of the neural network as included in the selected state predicting unit 64. As a result, the learning device 200 becomes able to set the same internal parameters in a plurality of state predicting units 64.

The learning device 200 practices the prediction device 40 based on teacher data. For example, the teacher data contains training data and correct-solution data. For example, the teacher data contains temporal data of one or more observation values, and temporal data of lane information and additional information. The correct-solution data contains the collection of predicted-state information and the collection of variance-covariance matrices which should be generated by the prediction device 40.

The learning device 200 adjusts the internal parameters of the neural network, which are included in the prediction device 40, in such a way that the collection of predicted-state information and the collection of variance-covariance matrices approach the correct-solution data. For example, based on the collection of predicted-state information and the collection of variance-covariance matrices as output in the case when the prediction device 40 is provided with the training data, the learning device 200 extracts the two-dimensional normal distribution of the positions of the mobile object. Then, in the two-dimensional normal distribution of the positions of the mobile object, the learning device 200 adjusts the internal parameters of the neural network in such a way that there is maximum probability of existence of the positions indicated in the correct-solution data.

Moreover, the correct-solution data can also contain likelihood information that should be output by the estimating unit 56. In that case, the learning device 200 adjusts the internal parameters of the neural network, which are included in the prediction device 40, in such a way that the likelihood information output by the prediction device 40 after being provided with the training data approaches the correct-solution data.

As a result of practicing the prediction device 40 as described above, the learning device 200 becomes able to accurately operate the prediction device 40.

As described above, the prediction device 40 according to the embodiment estimates the predicted-state information for the target lane having a high possibility that the mobile object moves from among a plurality of lanes. As a result, according to the prediction device 40, the predicted-state information for the target lane having a high possibility that the mobile object moves can be estimated with only a small amount of computing. In other words, according to the prediction device 40, since the predicted-state information need not be estimated for the lanes having a low possibility that the mobile object moves, the future states of the mobile object can be appropriately predicted with a small amount of computing.

Meanwhile, the computer programs executed in the information processing device 30 can be stored in a downloadable manner in a computer connected to a network such as the Internet. Alternatively, the computer programs executed in the information processing device 30 can be distributed via a network such as the Internet. Still alternatively, the computer programs executed in the information processing device 30 can be stored in advance in a nonvolatile recording medium such as a ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device controlling a vehicle, comprising:
   one or more hardware processors configured to function as:
   an observation value receiver that receives an observation value related to a movement of a mobile object that differs from the vehicle;
   a lane information receiver that receives lane information regarding a plurality of lanes having a possibility that the mobile object moves thereto after a reference time;
   an estimation processor that, based at least in part on the observation value and the lane information,
      generates, for each of the plurality of lanes, error information representing a position error and an angle error between the mobile object and the corresponding lane, and based at least in part on the observation value, the lane information, and the error information,
      estimates temporal change volume indicating a feature of a state of the mobile object with respect to the plurality of lanes, and
      likelihood information indicating a likelihood that the mobile object moves to a lane for each of the plurality of lanes;
   a masking unit;
   a plurality of state predicting units corresponding to the plurality of lanes respectively, wherein each state predicting unit
      obtains, through the masking unit and for a corresponding lane among the plurality of lanes, current-state information indicating one or more states of the mobile object as indicated by the observation value obtained at the reference time and the temporal change volume, and
      calculates, for when the mobile object moves to the corresponding lane and based on the current-state information and the temporal change volume that are obtained, predicted-state information indicating one or more states of the mobile object after the reference time; and
   a controller that controls the vehicle based on the predicted-state information, wherein
   the masking unit identifies, based on the likelihood information, one or more target lanes from among the plurality of lanes and gives the current-state information and the temporal change volume of the corresponding lane to each of one or more state predicting units corresponding to the one or more target lanes identified among the plurality of state predicting units, to cause one or more state predicting units to calculate the predicted-state information and to cause state predicting units other than the one or more state predicting units among the plurality of state predicting units not to calculate the predicted-state information.

2. The control device according to claim 1, wherein the prediction processor calculates the predicted-state information for each of a plurality of times at each a particular time interval after the reference time.

3. The control device according to claim 1, wherein the prediction processor identifies, from the plurality of lanes, one or more lanes having likelihood that is equal to or greater than a particular value as the one or more target lanes.

4. The control device according to claim 1, wherein the prediction processor identifies, from the plurality of lanes, one or more lanes corresponding to a particular number of likelihoods from top as the one or more target lanes.

5. The control device according to claim 1, wherein the current-state information and the predicted-state information indicate, for the mobile object, at least one of position, velocity, acceleration, angular velocity, angular acceleration, variance of position, variance of velocity, variance of acceleration, variance of angular velocity, or variance of angular acceleration.

6. The control device according to claim 1, wherein the observation value receiver receives, as the observation value, at least one of position, velocity, acceleration, angular velocity, and angular acceleration for the mobile object, or direction instruction information indicating a travel direction of the mobile object.

7. The control device according to claim 1, wherein, based at least in part on temporal data of the observation value prior to the reference time, the estimation processor estimates the temporal change volume and the likelihood information.

8. The control device according to claim 7, wherein the estimation processor comprises:
   an error calculator that, based at least in part on the temporal data of the observation value and the lane information, calculates, for each of the plurality of lanes, temporal error information indicating an error between the mobile object and a concerned lane;
   a temporal change volume estimation processor that, based at least in part on the temporal data of the observation value and the temporal error information, calculates the temporal change volume using a neural network; and
   a likelihood estimation processor that, based at least in part on the temporal change volume, calculates the likelihood information using a neural network.

9. The control device according to claim 1, wherein the prediction processor comprises one or more state prediction processors corresponding to the one or more target lanes, each of the one or more state prediction processors comprises:
   a control volume estimation processor that, for each of a plurality of times at each time interval after the reference time, estimates control volume and variance of the control volume to be applied to the mobile object to enable the mobile object to move to the target lane; and
   a calculator comprising a Kalman filter that, for each of the plurality of times at each time interval after the reference time, calculates the predicted-state information using the Kalman filter, the control volume estimation processor
estimates, based at least in part on the current-state information, the control volume and the variance of the control volume corresponding to a first time which arrives after a single time interval from the reference time, and
estimates, based at least in part on the predicted-state information that is calculated by the calculator and that corresponds to a time at previous time interval of an arbitrary second time which arrives after two time intervals onward from the reference time, the control volume and the variance of the control volume at the second time, and the calculator
calculates, based at least in part on the current-state information, and the control volume and the variance of the control volume corresponding to the first time as estimated by the control volume estimation processor, the predicted-state information corresponding to the first time which arrives after a single time interval from the reference time, and
calculates, based at least in part on the predicted-state information corresponding to the time at previous time interval of the second time and based on the control volume and the variance of the control volume corresponding to the second time as estimated by the control volume estimation processor, the predicted-state information corresponding to arbitrary of the second time which arrives after two time intervals onward from the reference time.

10. The control device according to claim 9, wherein each of the one or more state prediction processors sequentially calculates the predicted-state information at each time interval starting from the first time arriving after a single time interval from the reference time to last time arriving after predetermined number of intervals from the reference time.

11. The control device according to claim 9, wherein the control volume is a value applied to the mobile object in order to control at least one of position, velocity, acceleration, angular velocity, or angular acceleration for the mobile object.

12. The control device according to claim 9, wherein the control volume estimation processor calculates the control volume and the variance of the control volume using a neural network.

13. The control device according to claim 9, wherein the calculator, by using a neural network, calculates a parameter, in the Kalman filter, that represents a noise included in a model for performing time transition of covariance.

14. The control device according to claim 1, wherein the one or more hardware processors are configured to further function as:
an additional information obtaining unit that obtains additional information including signal light information indicating a lighting state of a signal light installed in each of the plurality of lanes on which the mobile object goes on, wherein
the estimation processor estimates the temporal change volume and the likelihood information based at least in part on the observation value, the lane information, the error information, and the additional information.

15. A control method for controlling a vehicle, by using an information processing device, predicted-state information that indicates one or more states of a mobile object, the prediction method comprising:
receiving, by an observation value receiver, an observation value related to a movement of the mobile object that differs from the vehicle;
receiving, by a lane information receiver, lane information regarding a plurality of lanes having a possibility that the mobile object moves thereto after a reference time;
estimating, by an estimation processor, based at least in part on the observation value and the lane information,
temporal change volume indicating a feature of a state of the mobile object with respect to the plurality of lanes, and
likelihood information indicating a likelihood that the mobile object moves to a lane for each of the plurality of lanes;
generating, for each of the plurality of lanes, error information representing a position error and an angle error between the mobile object and the corresponding lane, and based at least in part on the observation value, the lane information, and the error information;
obtaining, through a masking unit and for the corresponding lane among the plurality of lanes, current-state information indicating one or more states of the mobile object as indicated by the observation value obtained at the reference time and the temporal change volume;
calculating, for when the mobile object moves to the corresponding lane and based on the current-state information and the temporal change volume that are obtained, predicted-state information indicating one or more states of the mobile object after the reference time;
identifying, based on the likelihood information, one or more target lanes from among the plurality of lanes and giving the current-state information and the temporal change volume of the corresponding lane to each of one or more state predicting units corresponding to the one or more target lanes identified among the plurality of state predicting units, to cause the one or more state predicting units to calculate the predicted-state information and to cause state predicting units other than the one or more state predicting units among the plurality of state predicting units not to calculate the predicted-state information; and
controlling the vehicle based on the predicted-state information.

16. A computer program product comprising a computer readable medium comprising programmed instructions, wherein the instructions, when executed by an information processing device, cause the computer to predict predicted-state information, which indicates one or more states of a mobile object, and to function controlling a vehicle as:
an observation value receiver that receives an observation value related to a movement of the mobile object that differs from the vehicle;
a lane information receiver that receives lane information regarding a plurality of lanes having a possibility that the mobile object moves thereto after a reference time;
an estimation processor that, based at least in part on the observation value and the lane information, generates, for each of the plurality of lanes, error information representing a position error and an angle error between the mobile object and the corresponding lane, and based at least in part on the observation value, the lane information, and the error information,
estimates temporal change volume indicating a feature of a state of the mobile object with respect to the plurality of lanes, and likelihood information indicating a likelihood that the mobile object moves to a lane for each of the plurality of lanes;

a masking unit;

a plurality of state predicting units corresponding to the plurality of lanes respectively, wherein each state predicting unit obtains, through the masking unit and for a corresponding lane among the plurality of lanes, current-state information indicating one or more states of the mobile object as indicated by the observation value obtained at the reference time and the temporal change volume, and calculates, for when the mobile object moves to the corresponding lane and based on the current-state information and the temporal change volume that are obtained, predicted-state information indicating one or more states of the mobile object after the reference time; and a controller that controls the vehicle based on the predicted-state information, wherein the masking unit identifies, based on the likelihood information, one or more target lanes from among the plurality of lanes and gives the current-state information and the temporal change volume of the corresponding lane to each of one or more state predicting units corresponding to the one or more target lanes identified among the plurality of state predicting units, to cause the one or more state predicting units to calculate the predicted-state information and to cause state predicting units other than the one or more state predicting units among the plurality of state predicting units not to calculate the predicted-state information.

17. A vehicle control system controlling a vehicle, comprising:

a prediction device that predicts predicted-state information which indicates one or more states of a mobile object that differs from the vehicle; and a vehicle control device that, based at least in part on the predicted-state information, controls a drive mechanism for driving a vehicle, wherein the prediction device comprises one or more hardware processors configured to function as:

an observation value receiver that receives an observation value related to a movement of the mobile object, a lane information receiver that receives lane information regarding a plurality of lanes having a possibility that the mobile object moves thereto after a reference time, an estimation processor that, based at least in part on the observation value and the lane information, generates, for each of the plurality of lanes, error information representing a position error and an angle error between the mobile object and the corresponding lane, and based at least in part on the observation value, the lane information, and the error information, estimates temporal change volume indicating a feature of a state of the mobile object with respect to the plurality of lanes, and likelihood information indicating a likelihood that the mobile object moves to a lane for each of the plurality of lanes, a masking unit, and a plurality of state predicting units corresponding to the plurality of lanes respectively, wherein each state predicting unit obtains, through the masking unit and for a corresponding lane among the plurality of lanes, current-state information indicating one or more states of the mobile object as indicated by the observation value obtained at the reference time and the temporal change volume, and calculates, for when the mobile object moves to the corresponding lane and based on the current-state information and the temporal change volume that are obtained, predicted-state information indicating one or more states of the mobile object after the reference time; and wherein the masking unit identifies, based on the likelihood information, one or more target lanes from among the plurality of lanes and gives the current-state information and the temporal change volume of the corresponding lane to each of one or more state predicting units corresponding to the one or more target lanes identified among the plurality of state predicting units, to cause the one or more state predicting units to calculate the predicted-state information and to cause state predicting units other than the one or more state predicting units among the plurality of state predicting units not to calculate the predicted-state information.

* * * * *